United States Patent
Donovan et al.

(10) Patent No.: US 7,256,792 B1
(45) Date of Patent: *Aug. 14, 2007

(54) METHOD AND APPARATUS FOR SAMPLING NON-POWER OF TWO DIMENSION TEXTURE MAPS

(75) Inventors: Walter E. Donovan, Saratoga, CA (US); Rajeev Jayavant, Fort Collins, CO (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/493,153

(22) Filed: Jul. 26, 2006

Related U.S. Application Data (63) Continuation of application No. 10/874,832, filed on Jun. 23, 2004.

(51) Int. Cl.
*G09G 5/00* (2006.01)
*G09T 15/60* (2006.01)
*G06T 17/00* (2006.01)
*G06K 9/40* (2006.01)

(52) U.S. Cl. .................. 345/582; 345/428; 345/586; 345/606; 345/660; 382/276; 382/300

(58) Field of Classification Search ........ 345/581–588, 345/418–428, 606–607, 611, 646–647, 561, 345/572, 600, 643, 660, 427; 382/260, 265, 382/293, 298, 299, 276, 254, 269, 300
See application file for complete search history.

(56) References Cited

U.S. PATENT DOCUMENTS

| | | | |
|---|---|---|---|
| 5,877,771 A * | 3/1999 | Drebin et al. ............... 345/586 |
| 5,977,983 A * | 11/1999 | Einkauf et al. ............. 345/582 |
| 6,292,193 B1 * | 9/2001 | Perry et al. ................. 345/582 |
| 6,876,362 B1 * | 4/2005 | Newhall et al. ............ 345/426 |
| 6,919,904 B1 * | 7/2005 | Kilgariff ..................... 345/582 |
| 2002/0030681 A1 * | 3/2002 | Ritter ......................... 345/426 |
| 2005/0110790 A1 * | 5/2005 | D'Amora .................... 345/419 |

* cited by examiner

*Primary Examiner*—Wesner Sajous
(74) *Attorney, Agent, or Firm*—Patterson & Sheridan, LLP (57) ABSTRACT

An apparatus and method for using non-power of two texture maps is described. Normalized texture map coordinates such as s and t are converted from a floating point format to a fixed point format and wrapping operations are performed to produce unnormalized texture map coordinates such as u and v corresponding to non-power of two texture maps.

20 Claims, 9 Drawing Sheets

PRIOR ART

FIG. 1A

PRIOR ART

FIG. 1B

PRIOR ART

METHOD AND APPARATUS FOR SAMPLING NON-POWER OF TWO DIMENSION TEXTURE MAPS

CROSS-REFERENCE TO RELATED APPLICATIONS

This application is a continuation of co-pending U.S. patent application Ser. No. 10/874,832, filed Jun. 23, 2004. Each of the aforementioned related patent applications is herein incorporated by reference.

BACKGROUND OF THE INVENTION

1. Field of the Invention

One or more aspects of the invention generally relate to computer graphics, and more particularly to texture map data.

2. Description of the Related Art

Conventional graphics processors are exemplified by systems and methods developed to read and filter texture map samples. Conventionally, normalized texture coordinates, such as s, t, and r corresponding to each pixel within a surface, are processed to compute unnormalized texture coordinates, such as u, v, and p. The unnormalized texture coordinates are represented in a fixed point format and are used to determine indices to access texels within a texture map. The normalized texture coordinates are typically represented using a floating point format and are scaled by the size (width or height) of the highest resolution level of detail (LOD) of a mip mapped texture map to produce fixed point format unnormalized texture coordinates.

Traditionally when a video image is used as a texture map it is first resampled to produce an "n×m" dimension texture map where n and m are each a power of two. Specifically, an "n" or "m" that is a power of two may be expressed as $n=2^i$ or $m=2^i$, respectively, where i is an integer. Furthermore, to simplify the texture map filtering performed within a graphics processor, the n×m dimension texture map is filtered and various resolutions of the filtered texture are stored as mip mapped texture maps.

Figure 1A:
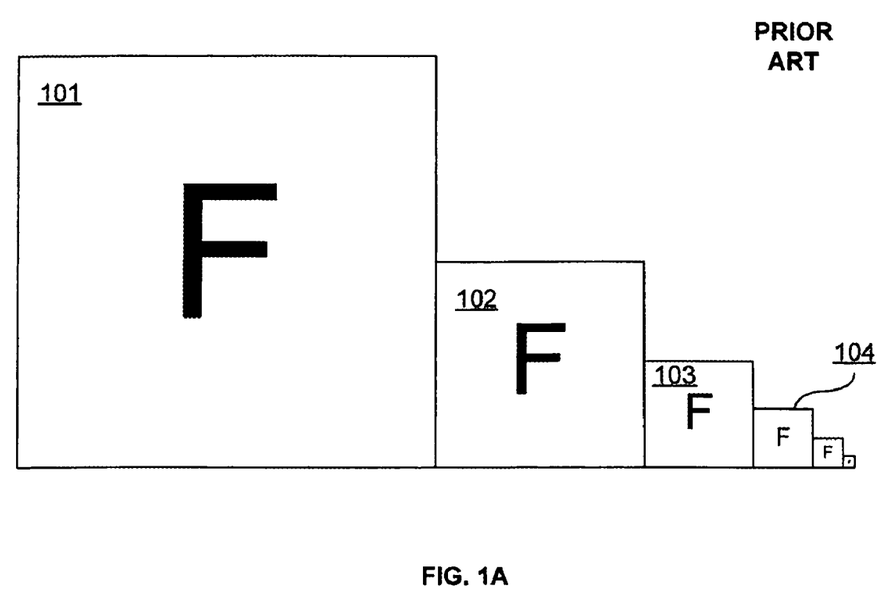
FIG. 1A is a diagram of prior art showing a mip mapped texture map.

FIG. 1A is a conceptual diagram of prior art showing a mip mapped texture including a highest resolution texture map, such as the n×m dimension texture map Texture Map 101. A Texture Map 102, a Texture Map 103, and a Texture Map 104 are successively lower resolution texture maps, mip maps, each storing filtered texels. Each mip map level texture map dimension is half the size of the previous (finer) mip map level texture map dimension, but not less than one. Traditionally texture map dimensions are powers of two in order to simplify computations used to convert from normalized texture coordinates to unnormalized texture coordinates. Specifically, scaling of a normalized texture coordinate by an LOD width or height may be performed using a bit shift instead of a multiply operation. Performing multiplying an integer (LOD width or height) and floating point value, such as a normalized texture coordinate is more difficult than performing multiplying an integer and a fixed point value. Accordingly, it is desirable to convert the normalized texture coordinates to a fixed point format prior to computing the unnormalized texture coordinates by scaling the normalized texture coordinates by an LOD dimension corresponding to a non-power of two texture map.

Figure 1B:
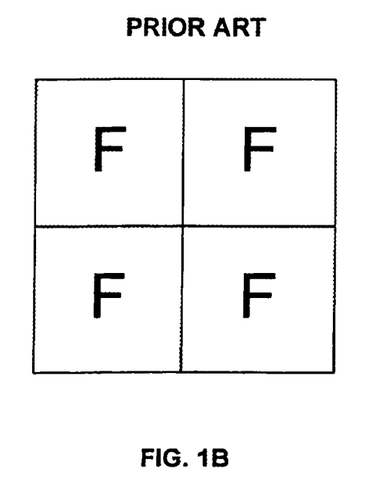
FIG. 1B illustrates a prior art application of a texture map to a surface using a repeat wrap mode.
Figure 1C:
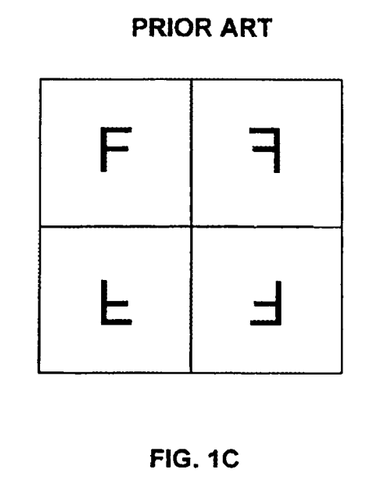
FIG. 1C illustrates a prior art application of a texture map to a surface using a mirror wrap mode.

Furthermore, when an unnormalized texture coordinate lies outside of the texture map, the unnormalized texture coordinate is modified to lie within the texture map according to a wrap mode. Power of two texture maps are also used to simplify computations used to support the wrap modes shown in FIGS. 1B and 1C. FIG. 1B illustrates a texture map applied to a square surface using a "repeat" wrap mode. FIG. 1C illustrates a texture map applied using a "mirror" wrap mode.

Accordingly, there is a need to apply a video image or other non-power of two texture map to a surface using a wrap mode. Furthermore, it is desirable to compute a fixed point normalized texture coordinate that lies within the texture map, i.e., has been wrapped according to the wrap mode, thereby assuring that the normalized texture coordinate that is computed using the unnormalized texture coordinate will also lie within the texture map.

SUMMARY OF THE INVENTION

The current invention involves new systems and methods for sampling non-power of two texture maps. Unnormalized texture coordinates for a texture map may be computed from normalized texture coordinates using fixed point computations. Furthermore, a non-power dimension texture map may be applied to a surface using a wrap mode, including a repeat, mirror, clamp to border, or clamp to edge wrap mode.

Various embodiments of a method of the invention include receiving a normalized texture map coordinate corresponding to a non-power of two texture map and applying a wrap function to the normalized texture map coordinate to produce a wrapped texture map coordinate that is represented as a fixed point value.

Various embodiments of another method of the invention include receiving a normalized texture map coordinate corresponding to a non-power of two texture map represented in a floating point format, converting the normalized texture map coordinate to a fixed point format to produce a fixed point normalized texture map coordinate, and processing the fixed point normalized texture map coordinate based on a wrapping mode to produce a wrapped texture map coordinate.

Various embodiments of the invention include a system for determining texture map coordinates for non-power of two texture maps. The system includes a means for receiving a normalized texture coordinate represented in a floating point format, a means for converting the normalized texture coordinate to a fixed point format, and a means for performing a wrap operation to produce a wrapped texture coordinate for the non-power of two texture map.

Various embodiments of the invention include a programmable graphics processor configured to apply non-power of two texture maps to surfaces.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 2A:
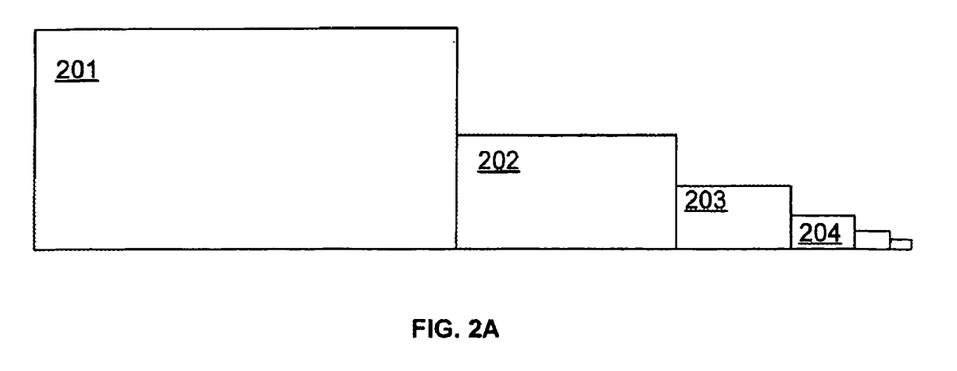
FIG. 2A is a diagram showing a mip mapped non-power of two texture map in accordance with one or more aspects of the present invention.

In conventional graphics processing, an image with a non-power of two dimension, such as a video frame, is resampled to produce a power of two texture map that is designated as the highest resolution level of detail texture map, LOD0. FIG. 2A is a diagram showing a mip mapped non-power of two rectangular texture map in accordance with one or more aspects of the present invention. A non-power of two Texture Map 201 designated as LOD0 may be an image that has not been resampled, such as a video frame. A Texture Map 202 (LOD1), a Texture Map 203 (LOD2), and a Texture Map 204 (LOD3) are mip map texture maps that are filtered versions of Texture Map 201. Each dimension, size_LODN, of a LODN mip map texture map in FIG. 2A may be computed using the following equation:

$$\text{size\_LODN} = \text{floor}(\text{size\_LOD0}/2^{LODN} + 0.5),$$

where size_LOD0 is the width or height in texels of the LOD0 level texture map. Another equation, $$\text{size\_LODN} = \text{ceil}(\text{size\_LOD0}/2^{LODN}),$$

may be used to compute each dimension of a LODN mip map texture map. Still another equation, $$\text{size\_LODN} = \text{floor}(\text{size\_LOD0}/2^{LODN}),$$

may be used to compute each dimension of a LODN mip map texture map.

Figure 2B:
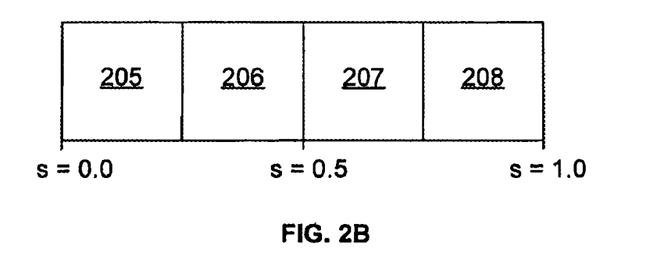
FIGS. 2B, 2C, and 2D are diagrams showing the relationship between normalized, unnormalized, and texture indices.
Figure 2C:
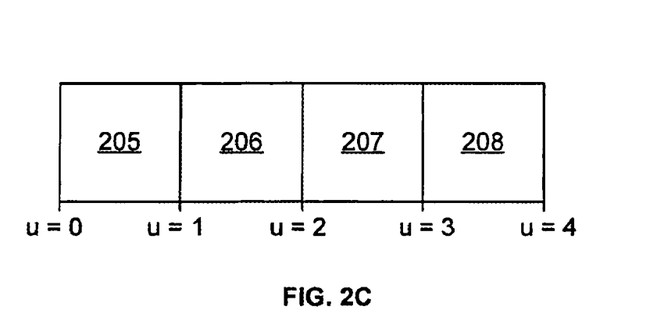
Figure 2D:
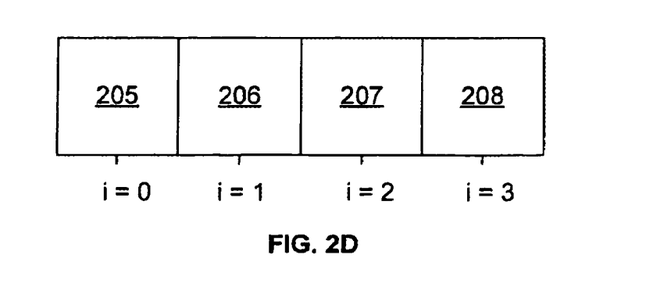

FIGS. 2B, 2C, and 2D are diagrams showing the relationship between normalized, unnormalized, and texture indices. FIG. 2B illustrates the use of normalized texture coordinates, such as s, t, and r, corresponding to each of four texels, a Texel 205, 206, 207, and 208, mapped to a surface. The normalized texture coordinates are typically represented in a floating point format and are normalized, ranging in value from 0 to 1 within a LOD texture map. Normalized texture coordinates may also lie outside of a texture map, in which case the wrap mode is used to determine how the normalized texture coordinate is modified to produce a fixed point format wrapped texture coordinate that lies within the texture map, as further described herein. Unnormalized texture coordinates associated with a surface are determined using normalized texture coordinates. Specifically, power of two texture map unnormalized texture coordinates are computed by multiplying the wrapped texture coordinates by an LOD dimension, e.g., width, height, depth, or the like.

FIG. 2C illustrates the use of unnormalized texture coordinates, such as such as u, v, and p, corresponding to each of the four texels, Texels 205, 206, 207, and 208, mapped to the surface. The unnormalized texture coordinates are typically represented in a fixed point format and are used to specify a particular texel. Unnormalized texture coordinates, e.g., u and v, within a texture map range from 0 to (size_LODN−1), where size_LODN is the size of a dimension, e.g., width or height, in texels of LODN. Unnormalized texture coordinates may also lie outside of a texture map, in which case a wrap mode is used to determine how the unnormalized texture coordinate is modified to lie within the texture map, using techniques known to those skilled in the art.

Texel indices associated with a surface are determined using unnormalized texture coordinates. FIG. 2D illustrates the use of texel indices, such as i, j, or k, corresponding to each of the four texels, Texels 205, 206, 207, and 208, mapped to the surface. Texel indices range from 0 to (size_LODN−1) and are centered on each texel. Texel indices are used to compute an address that is used to read each texel from a texture map stored in memory.

Figure 3A:
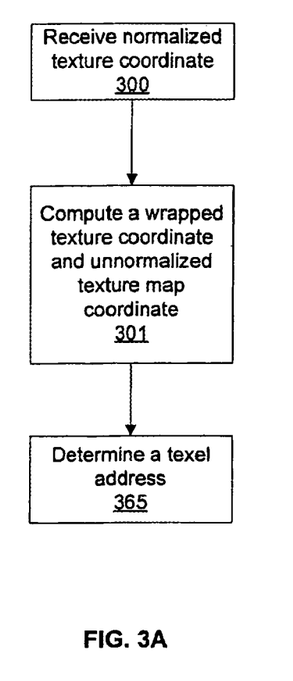
FIG. 3A illustrates an embodiment of a method of producing a texel address based on a normalized texture map coordinate for a non-power of two texture map in accordance with one or more aspects of the present invention.

FIG. 3A illustrates an embodiment of a method of producing a texel address based on a normalized texture map coordinate for a non-power of two texture map in accordance with one or more aspects of the present invention. In step 300 a normalized texture coordinate, such as s or t is received. In step 301 a fixed point format wrapped texture coordinate is computed based on a wrap mode and an unnormalized texture coordinate is determined using the wrapped texture coordinate as described in conjunction with FIG. 3B. In step 365 the unnormalized texture map coordinate is used to determine a texture index that is used to compute a texel address using techniques known to those skilled in the art.

Figure 3B:
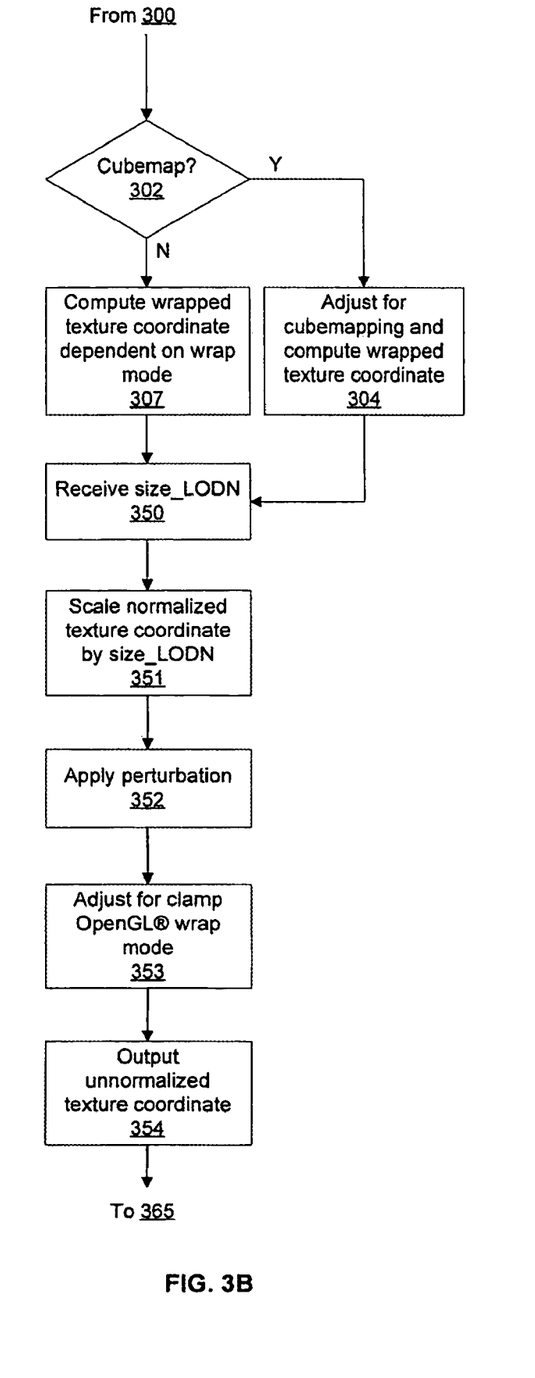
FIG. 3B illustrates an embodiment of a method of producing an unnormalized texture map coordinate for a non-power of two texture map in accordance with one or more aspects of the present invention.

FIG. 3B illustrates an embodiment of a method of performing step 301 of FIG. 3A, i.e., producing an unnormalized texture map coordinate for a non-power of two texture map, in accordance with one or more aspects of the present invention. In step 302 the method determines if the texture map is a cubemap, and, if so, then in step 304 the normalized texture map coordinate is adjusted for cubemapping and the wrapped texture coordinate is computed as described in conjunction with FIG. 3C. If, in step 302, the method determines that the texture map is not a cubemap, then in step 307 the wrapped texture coordinate is computed dependent on the wrap mode as described in conjunction with FIG.

3D. The wrap mode may be selected by a user, specified for a particular texture map, or determined by an application program.

In step 350 a non-power of two size of texture map, such as width, corresponding to an LODN, size_LODN, is received. LODN, specifying a specific texture map within a set of mip mapped texture maps is determined using a technique known to those skilled in the art. For example, when LOD0 is used, the size_LODN received for the width dimension of Texture Map 201, LOD0_size is 223. Likewise, when LOD1 is used, the size_LODN received for the width dimension of Texture Map 202, LOD1_size is 112. In an alternative embodiment, another LOD dimension, such as a height, depth, or the like is received in step 350.

In step 351 the wrapped texture coordinate is scaled by the size_LODN, received in step 302, producing the unnormalized texture coordinate. For example, an unnormalized texture coordinate, $u_{LODN}$, for a non-power of two texture map is computed using a wrapped texture coordinate, s', according to the following equation:

$$u_{LODN} = s'^* size\_LODN.$$

Because the size_LODN is not a power of two, the scale operation is performed using multiplication instead of shifting the normalized texture coordinate by $\log_2 size\_LODN$. The unnormalized texture map coordinate corresponds to the normalized texture map coordinate received in step 300 for the non-power of two texture map. In some embodiments of the present invention the product of the multiplication is represented as a fixed point format using an 18 bit integer and a 20 bit fraction. The precision of the product is then reduced to produce an 18 bit integer and 8 bit fraction representing the wrapped texture coordinate.

In step 352 the unnormalized texture coordinate is optionally perturbed, for example to produce additional unnormalized texture coordinates based on the texture filter mode, e.g., anisotropic, bilinear, or the like. In step 353 the unnormalized texture map coordinate(s) is adjusted either the clamp OpenGL® wrap mode or mirror clamp OpenGL® wrap mode is used. A function may be used to adjust the unnormalized texture map coordinate so that an unnormalized texture map coordinate that has been perturbed remains within the texture. The code shown in Table 1 represents such a function that may be used to adjust the unnormalized texture map coordinate such as u. By way of illustration, the code is defined using C. However, any other language may be used to define the function.

TABLE 1

```
#define TEX_SCALE      8           // log2 scale factor
#define TEX_ONEHALF    (0x80)      // 0.5 in .8
/*
    clamp_ogl:         [0,w]-0.5 if linear,    [0,w)-0.5 if
                                                nearest
    mirror_clamp_ogl:  [-w,w]-0.5 if linear,   [-w,w)-0.5 if
                                                nearest
*/
static S023
tex_oglclamp(S023 u, U016 width, bool is_bilinear, bool is_mirrored)
{
    S023  low, high;
    int   w = ToInt(width);       // U013
    int   I, h;                    // S023
    assert (w <= 4096);
    // we'll never be using this for a bitblt texture
    w = w << TEX_SCALE;            // U13.8
    if (is_mirrored)
    {
```

TABLE 1-continued

```
        if (is_bilinear)   { I = -w; h = w;     }
        else               { I = -w; h = w-1;   }
    }
    else
    {
        if (is_bilinear)   { I = 0; h = w;      }
        else               { I = 0; h = w-1;    }
    }
    low  = ToS023(I - TEX_ONEHALF);
    high = ToS023(h - TEX_ONEHALF);
    return MIN(high, MAX(low, u));
}
```

In step 354 the unnormalized texture map coordinate for the non-power of two texture map is output. The unnormalized texture map coordinate may be used to determine an address for a texel and weight values for filtering texels to compute a filtered texel value.

Figure 3C:
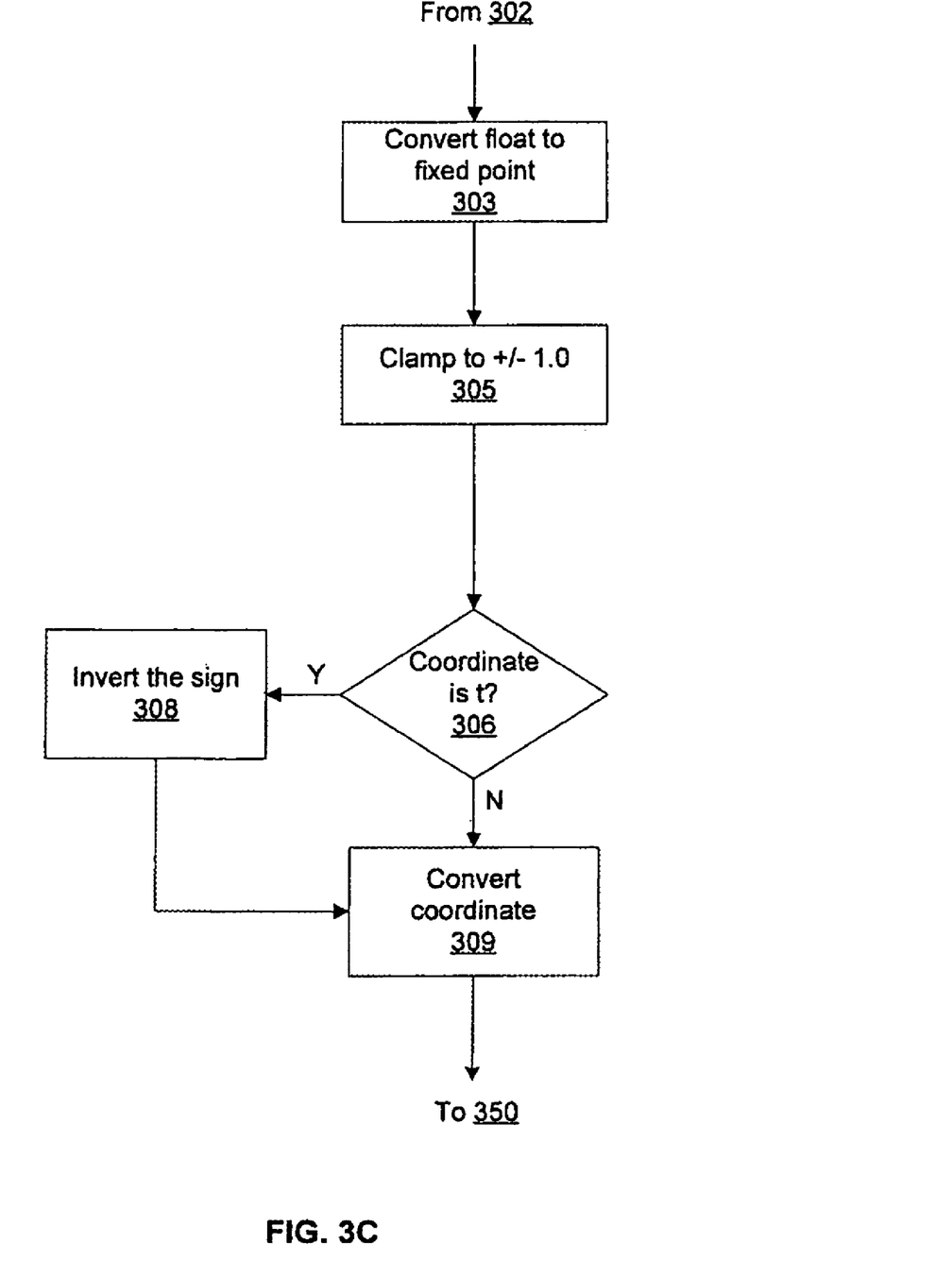
FIG. 3C illustrates an embodiment of a method of computing a wrapped texture map coordinate for cubemapping in accordance with one or more aspects of the present invention.
Figure 3D:
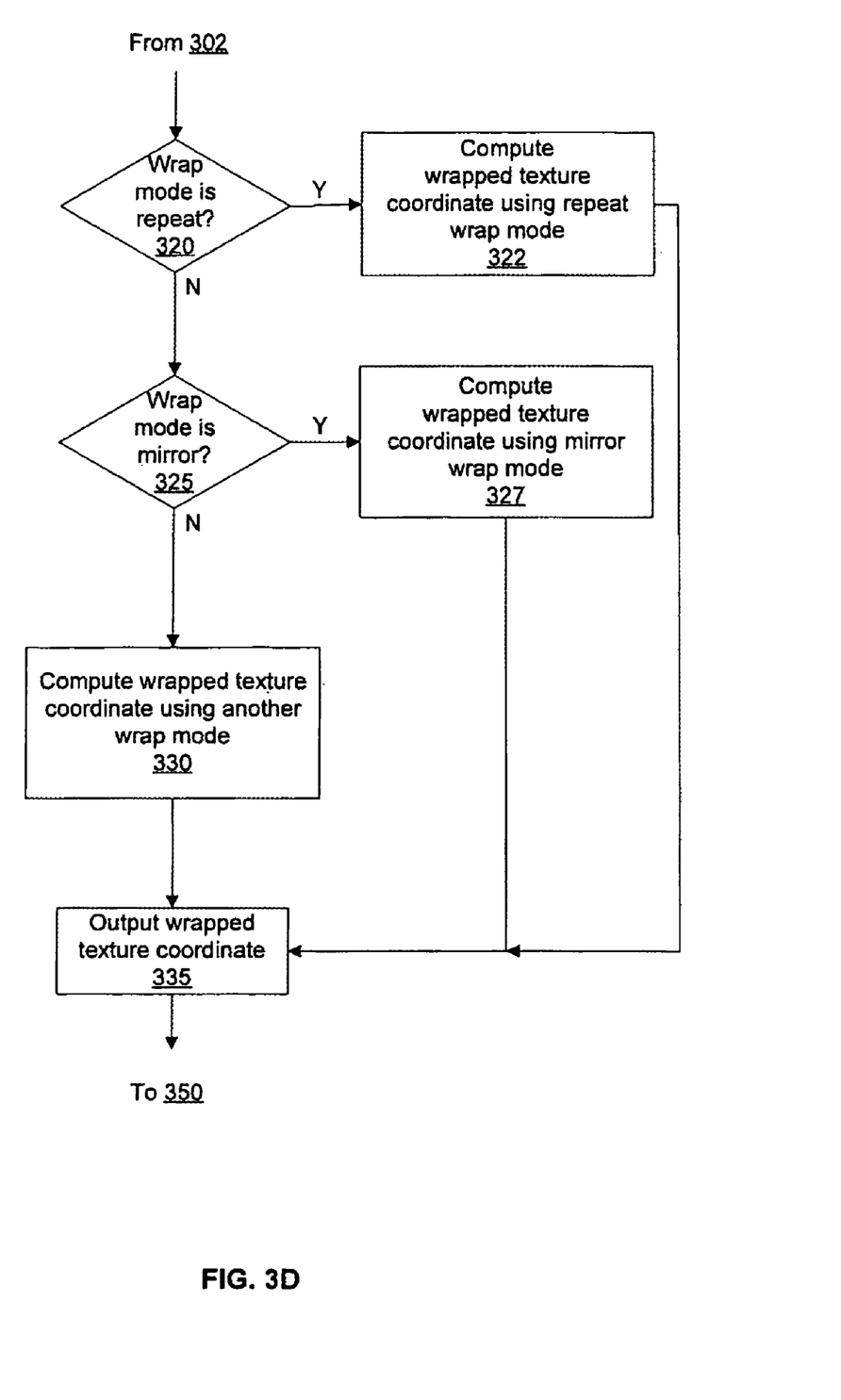
FIG. 3D illustrates an embodiment of a method of computing a wrapped texture map coordinate in accordance with one or more aspects of the present invention.

FIG. 3C illustrates an embodiment of a method of performing step 304 of FIG. 3B, i.e., computing a wrapped texture map coordinate for cubemapping in accordance with one or more aspects of the present invention. When cubemapping is used, normalized cube map texture coordinates, e.g., $s_c$, $t_c$, or the like, ranging in value from −1 to +1 are received in step 300 and wrapped texture map coordinates are computed using the following equations:

$$s = (s_c + 1)/2 \text{ and } t = (1 - t_c)/2.$$

In step 303 the normalized cube map texture coordinate is converted from a floating point format to an integer format, i.e., fixed point format. Converting the normalized cube map texture coordinate to a fixed point format simplifies the operations used to compute the unnormalized texture coordinate. In some embodiments of the present invention, fixed point operations may be performed faster, e.g., fewer clock cycles or at a faster clock rate, than floating point operations.

Typically floating point format values are represented using an IEEE 32 bit floating point format with 1 sign bit, an 8 bit exponent, and a 23 bit mantissa. A fixed point format representing the same range is not practical or efficient. Therefore, the number of bits included in the fixed point format is selected to match the result that would be obtained by using a floating point format to compute the unnormalized texture coordinate for all or most normalized texture coordinate values. In step 303 the normalized texture coordinate in a floating point format is converted to a normalized texture coordinate in a fixed point format to produce a fixed point normalized texture coordinate. The fixed point format includes a sign bit, a 5 bit integer, and a 20 bit fraction.

The number of bits in the integer is determined based on the filtering mode, e.g., bilinear, anisotropic, or the like. For example, 5 bits are needed to support 16× anisotropic filtering, permitting an anisotropic perturbation range of −8 to +8. In other embodiments of the present invention, the number of bits of integer in the fixed point format may vary. The number of bits in the fraction is determined based on the texture map resolution, with more bits needed for higher resolution texture maps. In other embodiments of the present invention, the number of bits of fraction in the fixed point format may vary.

In step 305 the fixed point normalized texture coordinate is clamped to a value between −1.0 and 1.0 to produce a clamped texture coordinate. In step 306 the method determines if the clamped texture coordinate is t, and, if so, then in step 308 the sign of the clamped texture coordinate is inverted to produce a negated texture coordinate. In step 308 the negated texture coordinate or the clamped texture coordinate is converted to a wrapped texture map coordinate, s' or t', using the previous equation, i.e., adding one and dividing by 2. The method proceeds to step 350 shown in FIG. 3B.

FIG. 3D illustrates an embodiment of a method of performing step 307 of FIG. 3B, i.e., computing a wrapped texture map coordinate in accordance with one or more aspects of the present invention. In step 320, the method determines if the repeat wrap mode is used, and, if so, then the method proceeds to step 322. Otherwise, the method proceeds to step 325. In step 322 the wrapped texture coordinate, such as s', is computed, based on the repeat wrap mode. The wrapped texture coordinate ranges in value from 0 up to, but not including 1. The normalized texture coordinate is converted from a floating point format to a fixed point format as previously described in conjunction with step 303 of FIG. 3C to produce a fixed point normalized texture coordinate. The fractional portion of the fixed point normalized texture coordinate is extracted to produce the wrapped texture coordinate. In some embodiments of the present invention, the following equation may be used to compute the wrapped texture coordinate:

s'=s mod 1.

The code shown in Table 2 represents a function that may be used in some embodiments of the present invention to compute the wrapped texture coordinate in step 322, where "is" is s' and "is" is represented in a fixed point format with a 5 bit integer and a 20 bit fraction. In other embodiments of the present invention, the number of bits representing the integer and fraction may vary. By way of illustration, the code is defined using C. However, any other language may be used to define the function.

TABLE 2

```
static float
ffloor(double arg)
{
    return float (floor (arg));
}
// conv_to_s5d20(s mod 1.0)
static S025
conv_to_s5d20mod1 (nv_float<8,23> ss)
{
    // Nan, +INF -> +MAX, -INF -> -MAX, in all cases
    // mod 1 gives a zero result.
    // float number is not a NaN or INF
    if (!ss.IsFinite( ))
        return ToS025(0);
    // treat denorms as zero
    ss = ss.ForceDenormsToZero( );
    // convert ss to a C++ float type
    float s = ss.ToFloat( );
    // if s is small, do the mod operation ourselves in
    // the &= below to avoid discrepancies
    // caused by float rounding for small negative s values
    if (fabs(s) > 1.0)
        s = s - ffloor(s);
    int is = int(ffloor(s * float(1 << 20)));
    // DO NOT ROUND
    is &= (1 << 20) - 1;
    // at this point is should be in [0,1)
    assert(is >= 0 && is <(1 << 20));
    return ToS025(is);
}
```

In step 325, the method determines if the mirror wrap mode is used, and, if so, the method proceeds to step 327. Otherwise, the method proceeds to step 330. In step 327 the wrapped texture coordinate, such as s', is computed, based on the mirror wrap mode. The wrapped texture coordinate ranges in value from 0 up to, but not including 2. The normalized texture coordinate is converted from a floating point format to a fixed point format as previously described in conjunction with step 303 of FIG. 3C to produce a fixed point normalized texture coordinate. A portion of the fixed point normalized texture coordinate is extracted to produce the wrapped texture coordinate. In some embodiments of the present invention, the following equation may be used to compute the wrapped texture coordinate:

s'=s mod 2.

The code shown in Table 3 represents a function that may be used in some embodiments of the present invention to compute the wrapped texture coordinate in step 327 to compute the mirror wrapped texture index, where "is" is s' and "is" is represented in a fixed point format with a 5 bit integer and a 20 bit fraction. In other embodiments of the present invention, the number of bits representing the integer and fraction may vary. By way of illustration, the code is defined using C. However, any other language may be used to define the function.

TABLE 3

```
ffloor(double arg)
{
    return float (floor (arg));
}
// conv_to_s5d20(s mod 2.0)
static S025
conv_to_s5d20mod2 (nv_float<8,23> ss)
{
    // Nan, +INF -> +MAX, -INF -> -MAX, in all cases
    // mod 2 gives a zero result
    if (!ss.IsFinite( ))
        return ToS025(0);
    // treat denorms as zero
    ss = ss.ForceDenormsToZero( );
    // convert ss to a C++ float type
    float s = ss.ToFloat( );
    // if s is small (after division), do the mod operation
    // ourselves in the &= below to avoid discrepancies
    // caused by float rounding for small negative s values
    if (fabs(s) > 2.0)
    {
        s = s/2.0f;
        s = s - ffloor(s);
        s = s * 2.0f;
    }
    int is = int(ffloor(s * float(1 << 20)));
    // DO NOT ROUND
    is &= (2 << 20) - 1;
    // at this point is should be in [0, 2)
    assert(is >= 0 && is < (2 << 20));
    return ToS025(is);
}
```

In step 330 the method has determined that a wrap mode other than mirror or repeat is used. For example, the wrap mode may be "clamp OpenGL®", "clamp to edge", "clamp to border", or the like. In step 330 the wrapped texture coordinate, such as s', is computed, based on the other wrap mode. The wrapped texture coordinate ranges in value from the minimum (negative) value represented by the fixed point format and up to, but not including the maximum value represented by the fixed point format. The normalized texture coordinate is converted from a floating point format to a fixed point format as previously described in conjunction with step 303 of FIG. 3C to produce a fixed point normalized texture coordinate. The fixed point normalized texture coordinate is clamped to a value between the minimum value and the maximum value when the fixed point normalized texture coordinate lies outside of the range bounded by the minimum value and the maximum value to produce the wrapped texture coordinate.

The code shown in Table 4 represents a function that may be used in some embodiments of the present invention to compute the wrapped texture coordinate in step 330 to compute the wrapped texture index, where "is" is s' and "is" is represented in a fixed point format with a 5 bit integer and a 20 bit fraction. IsNaN indicates the number is a NaN, IsPosInf indicates the number is +INF, and IsNegInf indicates the number is −INF. In other embodiments of the present invention, the number of bits representing the integer and fraction varies. By way of illustration, the code is defined using C. However, any other language may be used to define the function.

TABLE 4

```
static float
ffloor(double arg)
{
    return float (floor (arg));
}
// conv_to_s5d20(min(max(s, -16.0), 16.0-epsilon))
static S025
conv_to_s5d20clamp (nv_float<8,23> ss)
{
    if (ss.IsNaN( ) || ss.IsPosInf( ))
        return ToS025((16 << 20) - 1);     // clamp to +MAX
    else if (ss.IsNegInf( ))
        return ToS025(-(16 << 20));        // clamp to -MAX
    // treat denorms as zero
    ss = ss.ForceDenormsToZero( );
    // convert ss to a C++ float type
    float s = ss.ToFloat( );
    // clamp to [-16, 16], convert to fixed point, then clamp to 16)
    // (so we don't need to define a constant 16.0-epsilon)
    s = MIN(MAX(s, -16.0f), 16.0f);
    int is = int( ffloor(s * float(1 << 20)));
    // DO NOT ROUND
    is = MIN((16 << 20) - 1, is);
    // at this point is is in [-16,16)
    assert(is >= (-(16 << 20)) && is < (16 << 20));
    return ToS025(is);
}
```

In step 335 the wrapped texture coordinate is determined and the method proceeds to step 350 as described in conjunction with FIG. 3B.

Figure 3E:
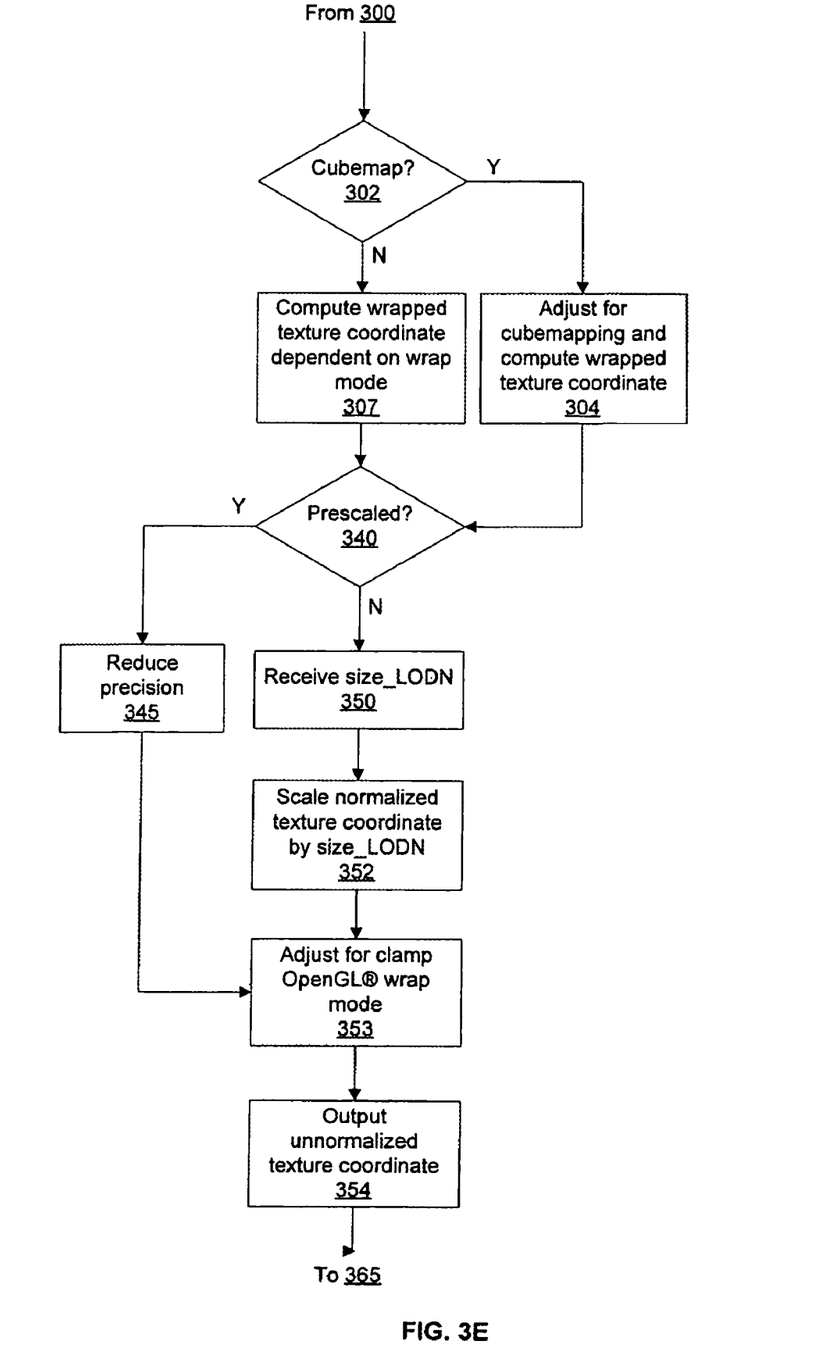
FIG. 3E illustrates another embodiment of a method of producing an unnormalized texture map coordinate for a non-power of two texture map in accordance with one or more aspects of the present invention.

FIG. 3E illustrates an embodiment of another method of performing step 301 of FIG. 3A, i.e., producing an unnormalized texture map coordinate for a non-power of two texture map, in accordance with one or more aspects of the present invention. In some embodiments of the present invention the normalized texture coordinate received in step 300 of FIG. 3A is prescaled by size_LODN. Therefore, the value of the normalized texture coordinate lies between 0 and size_LOD, rather than between 0 and 1. FIG. 3E includes the steps for processing the prescaled normalized texture coordinate in addition to the steps described in conjunction with FIG. 3B.

As previously described, in step 302 the method determines if the texture map is a cubemap. In some embodiments of the present invention, prescaled normalized texture coordinates are not used for cubemapping and in step 307 the wrapped texture coordinate is computed dependent on the wrap mode as described in conjunction with FIG. 3D. The wrap mode may be selected by a user, specified for a particular texture map, or determined by an application program.

When the repeat wrap mode is used, the wrapped texture coordinate computed using the prescaled normalized texture coordinate ranges in value from 0 up to, but not including size_LODN. The prescaled normalized texture coordinate is converted from a floating point format to a fixed point format to produce a fixed point normalized texture coordinate. A portion of the fixed point normalized texture coordinate is extracted to produce the wrapped texture coordinate. In some embodiments of the present invention, the following equation may be used to compute the wrapped texture coordinate in step 322 of FIG. 3D, where s is the prescaled normalized texture coordinate:

$$s'=s \bmod \text{size\_LODN}.$$

The code shown in Table 5 represents a function that may be used in some embodiments of the present invention to compute the wrapped texture coordinate in step 322 using a prescaled normalized texture coordinate, where "is" is s' and "is" is represented in a fixed point format with a 14 bit integer and a 11 bit fraction using a size_LODN of 4096. In other embodiments of the present invention, the number of bits representing the integer and fraction may vary. By way of illustration, the code is defined using C. However, any other language may be used to define the function.

TABLE 5

```
static float
ffloor(double arg)
{
    return float (floor (arg));
}
// conv_to_s14d11(s mod 4096.0)
static S025
conv_to_s14d11mod4096(nv_float<8,23> ss)
{
    // Nan, +INF -> +MAX, -INF -> -MAX, in all cases mod 4096
    // gives a zero result
    if (!ss.IsFinite( ))
        return ToS025(0);
    // treat denorms as zero
    ss = ss.ForceDenormsToZero( );
    // convert ss to a C++ float type
    float s = ss.ToFloat( );
    // if s is small (after division), do the mod operation ourselves in
    // the &= below to avoid discrepancies
    // caused by float rounding for small negative s values
    if (fabs(s) > 4096.0)
    {
        s = s/4096.0f;
        s = s - ffloor(s);
        s = s * 4096.0f;
    }
    int is = int(ffloor(s * float(1 << 11)));
    // DO NOT ROUND
    is &= (4096 << 11) - 1;
    // at this point is should be in [0, 4096)
    assert(is >= 0 && is < (4096 << 11));
    return ToS025(is);
}
```

When the mirror wrap mode is used, the wrapped texture coordinate computed using the prescaled normalized texture coordinate ranges in value from 0 up to, but not including 2*size_LODN. The prescaled normalized texture coordinate is converted from a floating point format to a fixed point format to produce a fixed point normalized texture coordinate. A portion of the fixed point normalized texture coordinate is extracted to produce the wrapped texture coordinate. In some embodiments of the present invention, the following equation may be used to compute the wrapped texture coordinate in step 327 of FIG. 3D, where s is the prescaled normalized texture coordinate:

$$s'=s \bmod (2*\text{size\_LODN}).$$

The code shown in Table 6 represents a function that may be used in some embodiments of the present invention to compute the wrapped texture coordinate in step 327 using a prescaled normalized texture coordinate, where "is" is s' and "is" is represented in a fixed point format with a 14 bit integer and a 11 bit fraction using a size_LODN of 4096. In other embodiments of the present invention, the number of bits representing the integer and fraction may vary. By way of illustration, the code is defined using C. However, any other language may be used to define the function.

TABLE 6

```
// conv_to_s14d11(s mod 8192.0)
static S025
conv_to_s14d11mod8192(nv_float<8,23> ss)
{
    // Nan, +INF -> +MAX, -INF -> -MAX, in all cases mod 8192
    // gives a zero result
    if (!ss.IsFinite( ))
        return ToS025(0);
    // treat denorms as zero
    ss = ss.ForceDenormsToZero( );
    // convert ss to a C++ float type
    float s = ss.ToFloat( );
    // if s is small (after division), do the mod operation
    // ourselves in the &= below to avoid discrepancies
    // caused by float rounding for small negative s values
    if (fabs(s) > 8192.0)
    {
        s = s/8192.0f;
        s = s - ffloor(s);
        s = s * 8192.0f;
    }
    int is = int(ffloor(s * float(1 << 11)));
    // DO NOT ROUND
    is &= (8192 << 11) - 1;
    // at this point is should be in [0, 8192)
    assert(is >= 0 && is < (8192 << 11));
    return ToS025(is);
}
```

When wrap mode other than mirror or repeat is used, in step 330 of FIG. 3D, the wrapped texture coordinate, such as s', is computed, based on the other wrap mode, e.g., "clamp OpenGL®", "clamp to edge", "clamp to border", or the like. The wrapped texture coordinate ranges in value from the minimum (negative) value represented by the fixed point format and up to, but not including the maximum value represented by the fixed point format. The prescaled normalized texture coordinate is converted from a floating point format to a fixed point format to produce a fixed point normalized texture coordinate. The fixed point normalized texture coordinate is clamped to a value between the minimum value and the maximum value when the fixed point normalized texture coordinate lies outside of the range bounded by the minimum value and the maximum value to produce the wrapped texture coordinate.

The code shown in Table 7 represents a function that may be used in some embodiments of the present invention to compute the wrapped texture coordinate in step 330 using a prescaled normalized texture coordinate, where "is" is s' and "is" is represented in a fixed point format with a 14 bit integer and a 11 bit fraction using a size_LODN of 4096. In other embodiments of the present invention, the number of bits representing the integer and fraction may vary. By way of illustration, the code is defined using C. However, any other language may be used to define the function.

TABLE 7

```
static float
ffloor(double arg)
{
    return float (floor (arg));
}
// conv_to_s14d11(min(max(s, -8192.0), 8192.0-epsilon))
static S025
conv_to_s14d11clamp (nv_float<8,23> ss)
{
    if (ss.IsNaN( ) || ss.IsPosInf( ))
        return ToS025((8192 << 11) - 1
    );                    // clamp to +MAX
    else if (ss.IsNegInf( ))
        return ToS025(-(8192 << 11)
    );                    // clamp to -MAX
    // treat denorms as zero
    ss = ss.ForceDenormsToZero( );
    // convert ss to a C++ float type
    float s = ss.ToFloat( );
    // clamp to [-8192, 8192], convert to fixed point, then clamp to 8192
    // (so we don't need to define a constant 8192.0-epsilon)
    s = MIN(MAX(s, -8192.0f), 8192.0f);
    int is = int(ffloor(s * float(1 << 11)));
    // DO NOT ROUND
    is = MIN((8192 << 11) - 1, is);
    assert(is >= (-(8192 << 11)) && is < (8192 << 11));
    return ToS025(is);
}
```

Following step 307 in FIG. 3E, the method proceeds to step 340. In step 340 the method determines if the normalized texture coordinates received in step 300 were prescaled, and, if not proceeds to complete steps 350, 351, 352, 353, and 354 as previously described in conjunction with FIG. 3B. If, in step 340 the method determines that the normalized texture coordinates received in step 300 were prescaled, then in step 345 the precision of the wrapped texture coordinate computed in step 307 is reduced from 11 bits of fraction to 8 bits of fraction. In other embodiments of the present invention, the number of bits the fractional portion of the fixed point wrapped texture coordinate is reduced by is different. The method then proceeds to step 353 as previously described in conjunction with FIG. 3B.

The method steps of FIGS. 3A, 3C, and 3D, and either FIG. 3B or 3E, may be represented as a function. The code shown in Table 8 represents such a function, where width is size_LODN. normalized_coords is asserted when the normalized texture coordinates are not prescaled by size_LODN. is_cubemap_s and is_cubemap_t are both asserted when cubemapping is used. By way of illustration, the code is defined using C. However, any other language may be used to define the function.

TABLE 8

```
static S022
apply_wrap_function_and_unnormalize(nv_float<8,23> s, U016 width,
Hwt20CacheWrapInternal wrap, bool normalized_coords, bool
is_cubemap_s, bool is_cubemap_t)
{
    S025 mod_s;
    // s converted to fixed point, either S5.20 or S14.11
    if (is_cubemap_s || is_cubemap_t)
    {
        assert (normalized_coords);
        switch(wrap)
        {
        case WRAP_WRAP:
        case WRAP_MIRROR:
        case WRAP_MIRROR_ONCE_CLAMP_OGL:
        case WRAP_MIRROR_ONCE_BORDER:
        case WRAP_MIRROR_ONCE_CLAMP_TO_EDGE:
```

TABLE 8-continued

```
        case WRAP_BORDER:
        case WRAP_CLAMP_OGL:
        case WRAP_CLAMP_TO_EDGE:    mod_s =
conv_to_s5d20clamp(s); break;
        default:                    assert(0);
        }
    // further clamp to [-1.0, 1.0] if cubemapped and only if cubemapped
    mod_s = ToS025(MAX(-(1 << 20), MIN((1 << 20),
ToInt(mod_s))));
        // apply the scaling (s+1)/2. It's OK to discard the low bit as
        // we have a high bit coming in.
        // for the t coordinate, LOD flips the sign of the coordinate
        // in case of cubemapping.
        mod_s = ToS025((ToInt(mod_s) + (1 << 20)) >> 1);
    }
    else if (normalized_coords)
    {
        switch(wrap)
        {
        case WRAP_WRAP:    mod_s = conv_to_s5d20mod1(s);
        break;
        case WRAP_MIRROR: mod_s = conv_to_s5d20mod2(s);
        break;
        case WRAP_MIRROR_ONCE_CLAMP_OGL:
        case WRAP_MIRROR_ONCE_BORDER:
        case WRAP_MIRROR_ONCE_CLAMP_TO_EDGE:
        case WRAP_BORDER:
        case WRAP_CLAMP_OGL:
        case WRAP_CLAMP_TO_EDGE:    mod_s =
conv_to_s5d20clamp(s); break;
        default:                    assert(0);
        }
    }
    else
    {
        // unnormalized
        switch(wrap){
        case WRAP_WRAP:    mod_s = conv_to_s14d11mod
4096(s);break;
        case WRAP_MIRROR: mod_s = conv_to_s14d11mod
8192(s);break;
        case WRAP_MIRROR_ONCE_CLAMP_OGL:
        case WRAP_MIRROR_ONCE_BORDER:
        case WRAP_MIRROR_ONCE_CLAMP_TO_EDGE:
        case WRAP_BORDER:
        case WRAP_CLAMP_OGL:
        case WRAP_CLAMP_TO_EDGE:    mod_s =
conv_to_s14d11clamp(s); break;
        default:                    assert(0);
        }
    }
    // now either multiply (s5d20 * u13) >> 12 = (s18d20 >> 12) = s18d8
    // or s14d11 >> 3 = s14d8
    S026 preclamp_u;
    U013 w = ToU013(width);
    if (normalized_coords)
    {
        // mod_s is s5d20
        S038 u1    = mod_s * w;           // s 18d20
        preclamp_u = ShiftToS026(u1);     // drop low 12 bits
    }
    else
    {
        // mod_s is s14d11
        preclamp_u = ToS026(ShiftToS022(mod_s)); // drop low 3 bits
    }
    // clamp from s18d8 to s14d8 -- clamp will not occur for
    // WRAP or MIRROR cases
    // min(max(-8192, preclamp_u), 8192.0-epsilon);
    int pcu = ToInt(preclamp_u);
    pcu = MIN(MAX((-8192 << 8), pcu), ((8192 << 8) - 1));
    return ToS022(pcu);
}
```

Therefore, persons skilled in the art will appreciate that any system configured to perform the method steps of FIGS. 3A, 3B, 3C, 3D, and 3E, or their equivalents, is within the scope of the present invention. Furthermore, persons skilled in the art will appreciate that the method steps of FIGS. 3A and 3B may be extended to support non-square texture maps. For example, size_LODN may represent any LOD dimension, such as width, height, or in the case of three or higher dimensional textures, depth. Additionally, each texture map dimension may be wrapped according to a separate wrap mode.

Figure 4A:
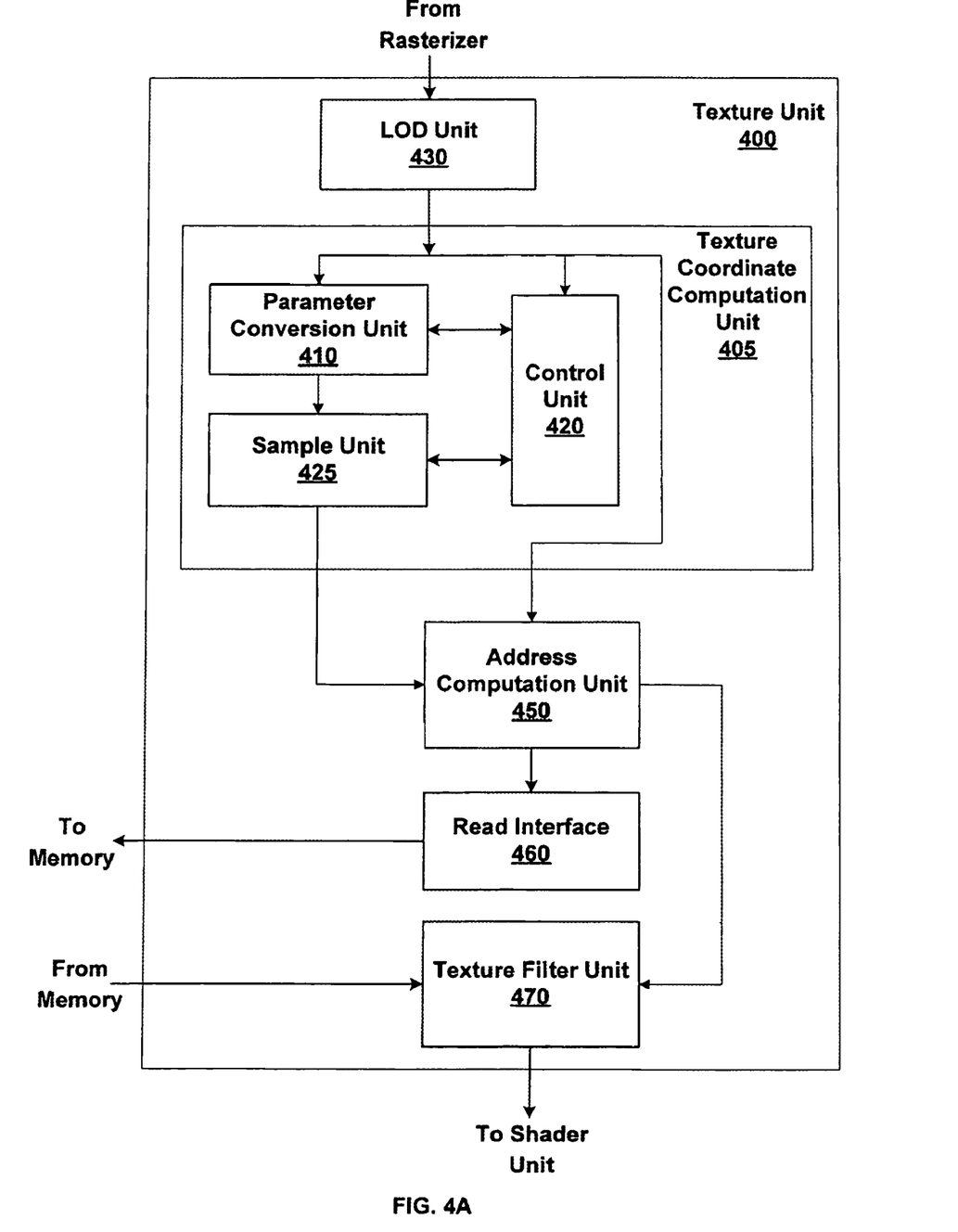
FIG. 4A is a block diagram of a portion of a shader unit including a texture unit in accordance with one or more aspects of the present invention.
Figure 5:
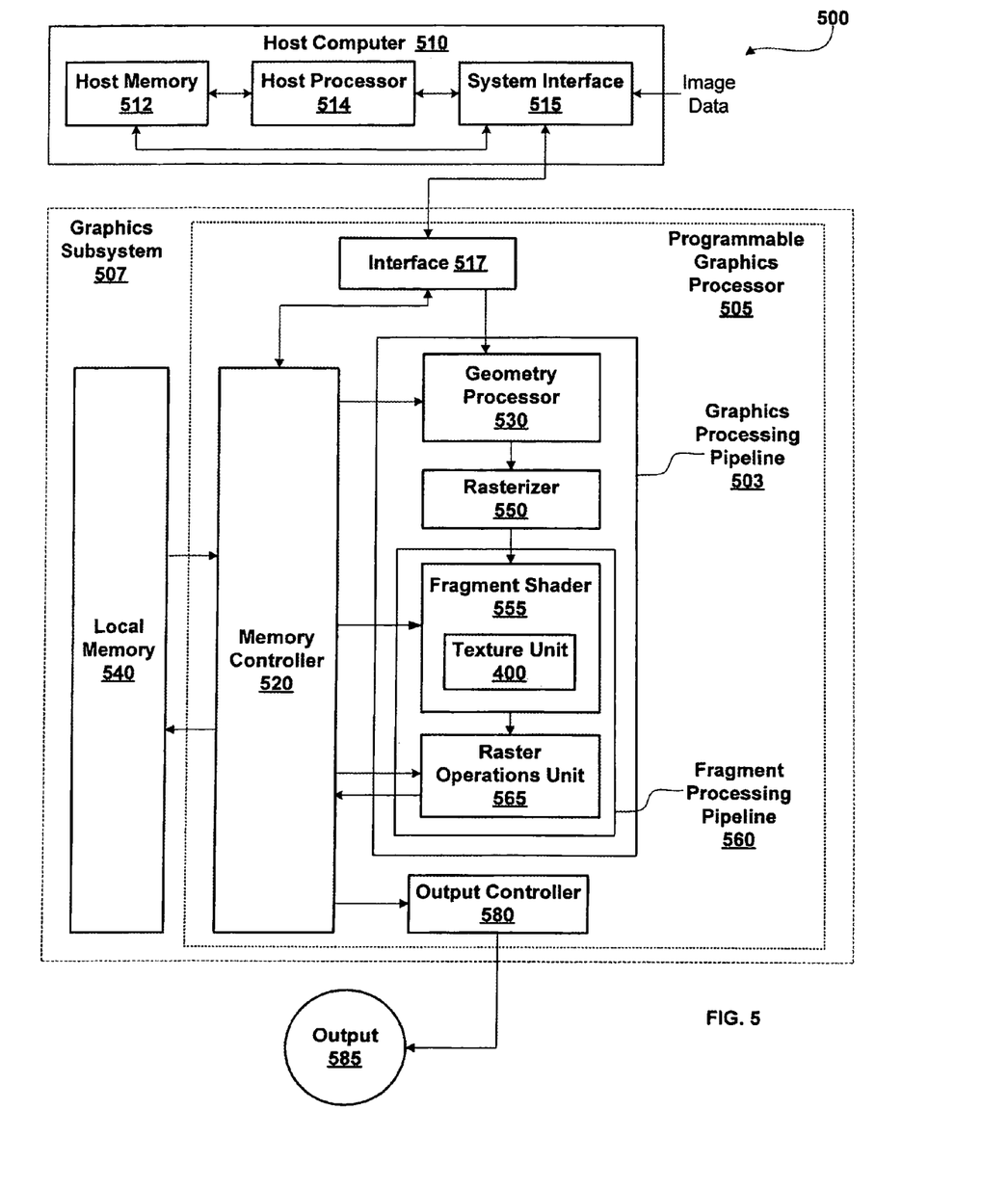
FIG. 5 is a block diagram of an exemplary embodiment of a respective computer system in accordance with one or more aspects of the present invention including a host computer and a graphics subsystem.

FIG. 4A is a block diagram of a portion of a graphics processing pipeline, to be described further herein in conjunction with FIG. 5. The graphics processing pipeline includes a Texture Unit 400 in accordance with one or more aspects of the present invention. In some embodiments, Texture Unit 400 receives data from a rasterizer, e.g., program instructions, and parameters associated with fragments (texture IDs, texture coordinates such as s and t, and the like). A fragment is formed by the intersection of a pixel and a primitive. Primitives include geometry, such as points, lines, triangles, quadrilaterals, meshes, surfaces, and the like. A fragment may cover a pixel or a portion of a pixel. Likewise, a pixel may include one or more fragments.

Texture Unit 400 includes an LOD Unit 430 which receives texture parameters and determines LOD values using a technique known to those skilled in the art. In some embodiments LOD Unit 430 outputs a size_LODN corresponding to each LOD value that is output. In some embodiments of the present invention LOD Unit 430 inverts the sign of the normalized texture coordinate, $t_c$ when cubemapping is used.

Texture Unit 400 includes a Texture Coordinate Computation Unit 405. A Control Unit 420 within Texture Coordinate Computation Unit 405 processes the program instructions, such as instructions to set the wrap mode or filter mode.

Parameters produced by the rasterizer are output by LOD Unit 430 and received by a Parameter Conversion Unit 410 within Texture Coordinate Computation Unit 405. Parameter Conversion Unit 410 computes the unnormalized texture coorindates using the method previously described in conjunction with FIG. 3B or FIG. 3E based on the wrap mode information received from Control Unit 420. Parameter Conversion Unit 410 outputs the unnormalized texture coordinates to a Sample Unit 425.

Sample Unit 425 determines perturbation values based on the filter mode that are applied to the unnormalized texture coordinates to compute sample positions, i.e., texture indices such as i, j, and k. When anisotropic filtering is specified, Sample Unit 425 computes the anisotropic step using the anisotropic ratio. In some embodiments of the present invention, Sample Unit 425 computes the anisotropic ratio. Sample Unit 425 determines and outputs weights, using techniques known to those skilled in the art, for use in filtering the texels read from memory. In some embodiments of the present invention, Sample Unit 425 adjusts the unnormalized texture coordinates (step 353 in FIGS. 3B and 3E) when the "clamp OpenGL®" wrap mode is specified. Sample Unit 425 also performs wrapping operations, as needed, so that the texture indices lie within the texture map.

Sample Unit 425 outputs texture indices to an Address Computation Unit 450. Address Computation Unit 450 uses the texture indices and other texture information, such as a texture ID received by Texture Unit 400, to determine addresses for reading texels from memory. Address Computation Unit 450 outputs the addresses to a Read Interface 460. Read Interface 460 outputs the addresses and a read request to a memory, e.g., cache, RAM, ROM, or the like. Texels read from memory are received from the memory by a Texture Filter Unit 470.

Texture Filter Unit 470 receives the weights from Address Computation Unit 450 and filters the texels read from memory using bilinear interpolation, trilinear interpolation, anisotropic filtering, or the like, to produce filtered texels. The filtered texels are output to a shader unit, described further herein, to compute a color for each fragment.

Figure 4B:
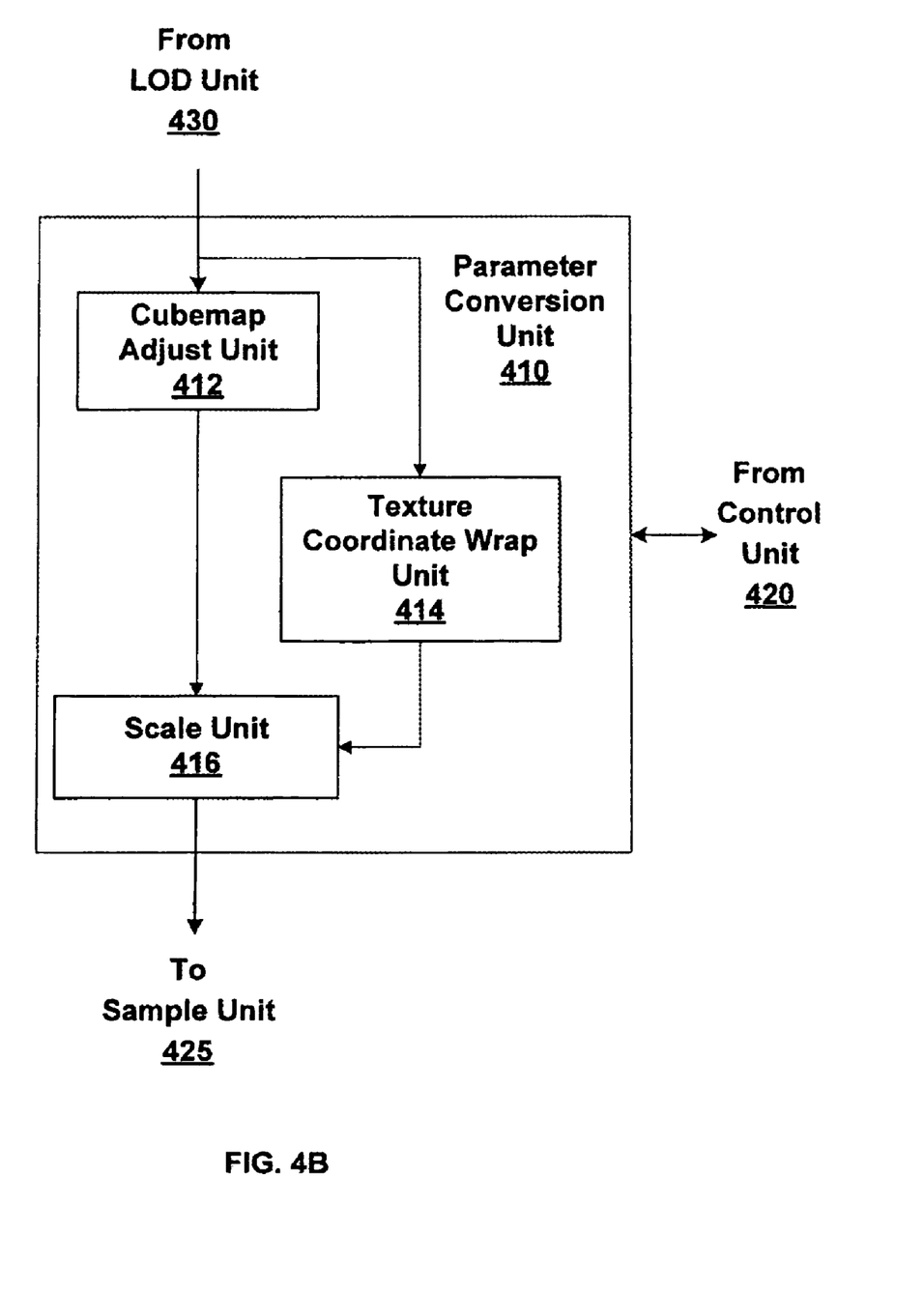
FIG. 4B is a block diagram of a portion of the parameter conversion unit of FIG. 4A in accordance with one or more aspects of the present invention.

FIG. 4B is a block diagram of a portion of Parameter Conversion Unit 410 of FIG. 4A in accordance with one or more aspects of the present invention. Parameter Conversion Unit 410 includes a Cubemap Adjust Unit 412, a Texture Coordinate Wrap Unit 414, and a Scale Unit 416. In some embodiments of the present invention, Cubemap Adjust Unit 412 is omitted, for example if cubemapping is not supported. Cubemap Adjust Unit 412 receives the normalized texture coordinates from the rasterizer and performs wrapping operations and converts normalized cube map texture coordinates, e.g., $s_c$, $t_c$, or the like, to wrapped texture map coordinates, e.g., s', t', or the like as described in conjunction with FIG. 3C.

In some embodiments of the present invention, Cubemap Adjust Unit 412 receives prescaled normalized cube map texture coordinates and computes the wrapped texture coordinates when cubemapping is used. Cubemap Adjust Unit 412 outputs the wrapped texture coordinates to Scale Unit 416. In an alternate embodiment of the present invention, Cubemap Adjust Unit 412 performs a subset of the steps shown in FIG. 3C and outputs normalized texture coordinates, such as, s and t, to Texture Coordinate Wrap Unit 414 and Texture Coordinate Wrap Unit 414 performs the wrapping operations to produce the wrapped texture coordinates.

Texture Coordinate Wrap Unit 414 receives the normalized texture coordinates from the rasterizer and computes wrapped texture coordinates.

Scale Unit 425 may include storage elements, e.g., registers, to store size_LODN values corresponding to texture maps. In an alternate embodiment, Scale Unit 425 receives size_LODN values from Control Unit 420. Scale Unit 425 scales the wrapped texture coordinates by the size_LODN to produce an unnormalized texture coordinate, for example, performing steps 350, 351, and 352, described in conjunction with FIGS. 3B and 3E. In an alternative embodiment of the present invention, Scale Unit 416 passes wrapped texture coordinates computed using prescaled normalized texture coordinates through to Sample Unit 425. In some embodiments of the present invention, Scale Unit 416 also adjusts the unnormalized texture coordinates (step 353 in FIGS. 3B and 3E) when the "clamp OpenGL®" wrap mode is specified. Scale Unit 425 outputs unnormalized coordinates to Sample Unit 425.

FIG. 5 is a block diagram of an exemplary embodiment of a Computing System generally designated 500 and including a Host Computer 510 and a Graphics Subsystem 507 including an embodiment of Texture Unit 400. Computing System 500 may be a desktop computer, server, laptop computer, palm-sized computer, tablet computer, game console, cellular telephone, PDA or other portable wireless appliance, computer based simulator, or the like. Host computer 510 includes Host Processor 514 that may include a system memory controller to interface directly to Host Memory 512 or may communicate with Host Memory 512 through a System Interface 515. System Interface 515 may be an I/O (input/output) interface or a bridge device including the system memory controller to interface directly to Host Memory 512. System Interface 515 can receive image data, such as video images, or the like. The image data, including non-power of two dimension images can be stored in Host Memory 512 or a Local Memory 540 within Graphics Subsystem 507 for use as a texture map.

Host computer 510 communicates with Graphics Subsystem 507 via System Interface 515 and an Interface 517. Graphics Subsystem 507 includes Local Memory 540 and a Programmable Graphics Processor 505. Programmable Graphics Processor 505 uses memory to store graphics data, including texture maps, and program instructions, where graphics data is any data that is input to or output from computation units within Programmable Graphics Processor 505. Texture maps stored in graphics memory may include non-power of two texture maps. Graphics memory is any memory used to store graphics data or program instructions to be executed by Programmable Graphics Processor 505. Graphics memory can include portions of Host Memory 512, Local Memory 540 directly coupled to Programmable Graphics Processor 505, storage resources coupled to the computation units within Programmable Graphics Processor 505, and the like. Storage resources can include register files, caches, FIFOs (first in first out memories), and the like.

In addition to Interface 517, Programmable Graphics Processor 505 includes a Graphics Processing Pipeline 503, a Memory Controller 520 and an Output Controller 580. Data and program instructions received at Interface 517 can be passed to a Geometry Processor 530 within Graphics Processing Pipeline 503 or written to Local Memory 540 through Memory Controller 520. In addition to communicating with Local Memory 540, and Interface 517, Memory Controller 520 also communicates with Graphics Processing Pipeline 503 and Output Controller 580 through read and write interfaces in Graphics Processing Pipeline 503 and a read interface in Output Controller 580.

Within Graphics Processing Pipeline 505, Geometry Processor 530 and a programmable graphics fragment processing pipeline, Fragment Processing Pipeline 560, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 530 and Fragment Processing Pipeline 560 are optionally configured such that data processing operations are performed in multiple passes through Graphics Processing Pipeline 503 or in multiple passes through Fragment Processing Pipeline 560. Each pass through Programmable Graphics Processor 505, Graphics Processing Pipeline 503 or Fragment Processing Pipeline 560 concludes with optional processing by a Raster Operations Unit 565.

Vertex programs are sequences of vertex program instructions compiled by Host Processor 514 for execution within Geometry Processor 530 and Rasterizer 550. Shader programs are sequences of shader program instructions compiled by Host Processor 514 for execution within Fragment Processing Pipeline 560. Geometry Processor 530 receives a stream of program instructions (vertex program instructions and shader program instructions) and data from Interface 517 or Memory Controller 520, and performs vector floating-point operations or other processing operations using the data. The program instructions configure subunits within Geometry Processor 530, Rasterizer 550 and Fragment Processing Pipeline 560. The program instructions and data are stored in graphics memory, e.g., portions of Host Memory 512, Local Memory 540, or storage resources within Programmable Graphics Processor 505. When a portion of Host Memory 512 is used to store program instructions and data the portion of Host Memory 512 can be uncached so as to increase performance of access by Programmable Graphics Processor 505. Alternatively, configuration information, including wrap mode information, is written to registers within Geometry Processor 530, Rasterizer 550 and Fragment Processing Pipeline 560 using program instructions, encoded with the data, or the like.

Data processed by Geometry Processor 530 and program instructions are passed from Geometry Processor 530 to a Rasterizer 550. Rasterizer 550 is a sampling unit that processes primitives and generates sub-primitive data, such as fragment data, including parameters associated with fragments (texture IDs, texture coordinates, and the like). Rasterizer 550 converts the primitives into sub-primitive data by performing scan conversion on the data processed by Geometry Processor 530. Rasterizer 550 outputs fragment data and shader program instructions to Fragment Processing Pipeline 560.

The shader programs configure the Fragment Processing Pipeline 560 to process fragment data by specifying computations and computation precision. Fragment Shader 555 is optionally configured by shader program instructions such that fragment data processing operations are performed in multiple passes within Fragment Shader 555. Fragment Shader 555 includes an embodiment of previously described Texture Unit 400. In one embodiment Texture Unit 400 is configured to read shader program instructions stored in Local Memory 540 or Host Memory 512 via Memory Controller 520.

Fragment Shader 555 outputs processed fragment data, e.g., color and depth, and codewords generated from shader program instructions to Raster Operations Unit 565. Raster Operations Unit 565 includes a read interface and a write interface to Memory Controller 520 through which Raster Operations Unit 565 accesses data stored in Local Memory 540 or Host Memory 512. Raster Operations Unit 565 optionally performs near and far plane clipping and raster operations, such as stencil, z test, blending, and the like, using the fragment data and pixel data stored in Local Memory 540 or Host Memory 512 at a pixel position (image location specified by x,y coordinates) associated with the processed fragment data. The output data from Raster Operations Unit 565 is written back to Local Memory 540 or Host Memory 512 at the pixel position associated with the output data and the results, e.g., image data are saved in graphics memory.

When processing is completed, an Output 585 of Graphics Subsystem 507 is provided using Output Controller 580. Alternatively, Host Processor 514 reads the image stored in Local Memory 540 through Memory Controller 520, Interface 517 and System Interface 515. Output Controller 580 is optionally configured by opcodes to deliver data to a display device, network, electronic control system, another computing system, such as Computing System 500, another graphics subsystem, such as Graphics Subsystem 507, or the like.

The invention has been described above with reference to specific embodiments. Persons skilled in the art will recognize, however, that various modifications and changes may be made thereto without departing from the broader spirit and scope of the invention as set forth in the appended claims. For example, in alternative embodiments, the method set forth herein may be implemented either partially or entirely in a software program or a fragment program executed by Fragment Shader 555. The foregoing description and drawings are, accordingly, to be regarded in an illustrative rather than a restrictive sense. The listing of steps in method claims do not imply performing the steps in any particular order, unless explicitly stated in the claim.

We claim:

1. A method of processing a normalized texture map coordinate corresponding to a non-power of two texture map, comprising:
    receiving the normalized texture map coordinate corresponding to the non-power of two texture map represented in a floating point format;
    applying a wrap function to the normalized texture map coordinate to produce a wrapped texture map coordinate that is represented as a fixed point value,
    wherein the normalized texture map coordinate has a fixed point value between 0 and size_LOD, where size_LOD is the size of a dimension in texels for the non-power of two texture map, the normalized texture map coordinate value being used to determine an address of a texel within the non-power of two texture map.

2. The method of claim 1, further comprising the steps of:
    receiving a non-power of two LOD dimension corresponding to the non-power of two texture map; and
    scaling the normalized texture map coordinate by the non-power of two LOD dimension to compute the unnormalized texture map coordinate for the non-power of two texture map.

3. The method of claim 2, wherein the non-power of two LOD dimension is selected from the group consisting of width, height, and depth.

4. The method of claim 1, wherein the normalized texture map coordinate for the non-power of two texture map is prescaled by the non-power of two LOD dimension.

5. The method of claim 1, wherein the wrapped texture map coordinate for the non-power of two texture map is used to determine an address of a texel within the non-power of two texture map.

6. The method of claim 1, wherein a number of bits in an integer portion of the fixed point value is determined based on a filtering mode.

7. The method of claim 6, wherein the filtering mode is selected from the group consisting of bilinear and anisotropic.

8. The method of claim 1, wherein a number of bits in a fractional portion of the fixed point value is determined based on a dimension of the non-power of two texture map.

9. The method of claim 1, wherein the wrap function is specified by a wrap mode selected from the group consisting of repeat, mirror, clamp, and clamp OpenGL®.

10. A method of using a non-power of two texture map, comprising:
    receiving a normalized texture map coordinate corresponding to the non-power of two texture map represented in a floating point format;
    determining if the texture map is a cube map, and if not, then;
    converting the normalized texture map coordinate to a fixed point format to produce a fixed point normalized texture map coordinate; and
    processing the fixed point normalized texture map coordinate based on a wrapping mode to produce a wrapped texture map coordinate.

11. The method of claim 10 further comprising receiving a non-power of two size of texture map, size_LODN, where LODN specifies a specific texture map within a set of mip mapped texture maps;
    scaling the wrapped texture map coordinate by the size_LODN producing an unnormalized texture map coordinate.

12. The method of claim 11 further comprising perturbing the unnormalized texture coordinate based on a texture filter mode to produce additional texture filter coordinates.

13. The method of claim 12 further comprising adjusting the unnormalized texture coordinates so that the perturbed texture map coordinates remain within the texture.

14. The method of claim 10, wherein the wrapped texture map coordinate for the non-power of two texture map is used to determine an address of a texel within the non-power of two texture map.

15. A computer readable medium that includes a set of instructions that when executed by a graphics processing unit causes the processing unit to determine texture map coordinates for non-power of two texture maps by performing the steps of:
  receiving a normalized texture coordinate corresponding to the non-power of two texture map represented in a floating point format;
  converting the normalized texture coordinate to a fixed point format;
  performing a wrap operation to produce a wrapped texture coordinate for the non-power of two texture map; and
  receiving the wrapped texture coordinate; and
  scaling the wrapped texture coordinate by a non-power of two LOD dimension of the non-power of two texture map to produce an unnormalized texture map coordinate.

16. The computer readable medium of claim 15 further comprising instructions to perform the steps of receiving a non-power of two size of texture map, size_LODN, where LODN specifies a specific texture map within a set of mip mapped texture maps; and
  scaling the wrapped texture map coordinate by the size_LODN producing an unnormalized texture map coordinate.

17. The computer readable medium of claim 15 including instructions to perform the steps of perturbing the unnormalized texture coordinate based on a texture filter mode to produce additional texture filter coordinates.

18. The computer readable medium of claim 15 including instructions to perform the steps of adjusting the unnormalized texture coordinates so that the perturbed texture map coordinates remain within the texture.

19. The computer readable medium of claim 16, further including instructions to perform the steps of:
  receiving the unnormalized texture coordinate; and
  producing an address corresponding to a texel in the non-power of two texture map.

20. The computer readable medium of claim 16, further comprising instructions to perform the steps of rasterizing a primitive to produce the normalized texture coordinate.

* * * * *